(12) United States Patent
Gothreaux

(10) Patent No.: US 6,207,047 B1
(45) Date of Patent: Mar. 27, 2001

(54) WASTEWATER TREATMENT SYSTEM

(75) Inventor: Richard Gothreaux, Scott, LA (US)

(73) Assignee: Sea Sanitizer International, L.L.C., Scott, LA (US)

( * ) Notice: Subject to any disclaimer, the term of this patent is extended or adjusted under 35 U.S.C. 154(b) by 0 days.

(21) Appl. No.: 09/272,799

(22) Filed: Mar. 19, 1999

Related U.S. Application Data

(63) Continuation-in-part of application No. 09/014,142, filed on Jan. 27, 1998, now Pat. No. 5,928,514, which is a continuation-in-part of application No. 08/701,121, filed on Nov. 5, 1996, now abandoned.

(51) Int. Cl.$^7$ .................................................. C02F 3/06
(52) U.S. Cl. ...................... 210/150; 210/195.1; 210/196; 210/257.1
(58) Field of Search .................................. 210/610, 615, 210/617, 618, 621, 622, 150, 151, 194, 195.1, 195.3, 196, 241, 242, 257.1

(56) References Cited

U.S. PATENT DOCUMENTS

| | | | |
|---|---|---|---|
| 3,539,507 | * 11/1970 | Woodbridge et al. | 210/622 |
| 3,788,476 | 1/1974 | Othmer | 210/194 |
| 3,870,634 | 3/1975 | Humphrey | 210/220 |
| 3,907,673 | 9/1975 | Belk et al. | 210/17 |
| 4,071,445 | 1/1978 | Katayama et al. | 210/23 |
| 4,210,528 | 7/1980 | Coviello et al. | 210/4 |
| 4,391,703 | 7/1983 | Crosby | 210/151 |
| 4,493,895 | 1/1985 | Colaruotolo et al. | 435/262 |
| 4,559,142 | 12/1985 | Morper | 210/607 |
| 4,925,552 | 5/1990 | Bateson et al. | 210/150 |
| 4,999,103 | 3/1991 | Bogart | 210/151 |
| 5,080,793 | * 1/1992 | Urlings | 210/150 |
| 5,156,742 | * 10/1992 | Struewing | 210/195.1 |
| 5,254,253 | 10/1993 | Behmann | 210/607 |
| 5,403,487 | 4/1995 | Lodaya et al. | 210/610 |
| 5,441,631 | * 8/1995 | Steyall, Sr. et al. | 210/257.1 |
| 5,480,551 | 1/1996 | Chudoba et al. | 210/616 |
| 5,618,412 | * 4/1997 | Herding et al. | 210/150 |
| 5,645,725 | 7/1997 | Zitzelsberger et al. | 210/605 |
| 5,650,070 | 7/1997 | Pollock | 210/612 |
| 5,674,399 | * 10/1997 | Davis | 210/621 |

* cited by examiner

Primary Examiner—Christopher Upton
(74) Attorney, Agent, or Firm—Kean, Miller, Hawthorne, D'Armond, McCowan & Jarman, L.L.P.

(57) ABSTRACT

A device for the treatment of wastewater is provided. The basic device includes a wastewater inlet, a connecting means and a bioreactor. The bioreactor is a substantially water-tight compartment which has its bioreactor inlet fluidly connected to the connecting means which is fluidly connected to the wastewater inlet. Inside the substantially water-tight compartment is controlled porous media inoculated with nitrifying aerobic bacteria. Additionally, many applications will require a plurality of bioreactors to be able to handle larger loads of wastewater. The plurality of bioreactors are connected in series by a plurality of bioreactor connecting means, each bioreactor connecting means fluidly connecting one bioreactor's outlet to another bioreactor's inlet. Effluent enters the plurality of bioreactors through first bioreactor's inlet and exits the plurality of bioreactors from the last bioreactor's outlet. In order to handle the greatest amount of wastewater, the plurality of bioreactors is connected to a primary treatment tank and a biofiltration tank. A primary pump directs effluent from the primary treatment tank to the biofiltration tank. The primary pump is activated when the volume in the primary treatment tank reaches an activation capacity and is deactivated when the volume in the primary treatment tank reaches a deactivation capacity. The biofiltration tank contains controlled porous media inoculated with nitrifying aerobic bacteria. A secondary pump directs effluent from the biofiltration tank to the first bioreactor's inlet.

7 Claims, 4 Drawing Sheets

WASTEWATER TREATMENT SYSTEM

CROSS-REFERENCE TO RELATED APPLICATION

This is a continuation-in-part of pending U.S. application Ser. No. 09/014,142 filed on Jan. 27, 1998, now U.S. Pat. No. 5,928,514, which is a continuation-in-part of U.S. application Ser. No. 08/701,121 filed on Nov. 5, 1996, now abandoned.

The disclosures of the parent applications, U.S. Ser. No. 09/014,142 and U.S. Ser. No. 08/701,121, are hereby incorporated by reference.

BACKGROUND OF THE INVENTION

1. Field of the Invention

This invention relates, generally, to sanitization devices and wastewater treatment systems for either secondary treatment systems or stand-alone treatment systems.

2. Description of Prior Art

Mobile vessels such as motor vehicles, aircraft, and watercraft, especially those of larger size, are often equipped with a toilet. Of late there has been a greater emphasis on treatment of wastewater from these on-board toilets, known as heads. Some regulatory measures have been implemented which severely restrict the bodies of water into which watercraft can discharge untreated wastewater and other types of liquid discharge.

Other regulations allow discharge into certain bodies of water, but the effluent discharged must meet certain treatment standards.

The increased regulation and the desire of watercraft owners and operators to minimize the environmental impact of the discharge from their vessel have led to the development of various Marine Sanitation Devices (MSDs). Current Coast Guard regulations discuss three classes of MSDs. Type I MSDs treat wastewater with chemicals or by other means prior to discharging the treated wastewater from the vessel. Type I MSDs must meet certain standards for the discharge and the discharge can have limited visible floating solids. Type II MSDs operate similarly to Type I MSDs but must meet higher treatment standards. A Type III MSD is simply a holding tank.

The disadvantage of having only a holding tank (a Type III MSD) is that the vessel is severely restricted as to where it can discharge the untreated wastewater. Generally, the vessel will have to be on the high seas to discharge the untreated waste or will have the holding tank pumped out. Unauthorized discharges can result in serious penalties for the vessel operator.

Vessels up to and including those 65 feet or greater in length may use Type I, II, or III MSDs. Vessels 66 feet and over must have a Type II or Type III MSD. Because Type II MSDs are typically bigger and more expensive, and because they generally require more power than Type I MSDs, Type II MSDs are not commonly found on vessels 65 feet and smaller.

Type I devices include those which use the salinity of the water and electrical current to make hypochlorous acid (chlorine), which then treats the wastewater. These devices require salt water in order to operate. If used in fresh water, such as that found in many inland lakes and streams, the operator must add salt to the device. Other disadvantages of these devices are their bulk and the large amount of power necessary to operate them.

Another Type I MSD is a system in which the wastewater is flowed through a cartridge which contains a solid chlorine tablet. The tablet dissolves as the wastewater is treated. A further disadvantage of the electric current and chlorine cartridge systems discussed above is that they are limited to treating a single "flush" batch at a time. Neither of these Type I MSDs typically has any holding capacity.

Other Type I systems do have the capacity to hold more than one flush. However, the operator must carry and resupply the chemicals necessary for treatment of the wastewater in the tank.

Environmental concerns and stricter regulations are similarly generating increased awareness in land-based septic treatment systems. Many residences and businesses do not have access to municipal sewer treatment facilities and must treat wastewater on their own. Wastewater treatment systems, particularly those in rocky soil locations or those situated near rivers, lakes or other bodies of water, often incorporate a septic chamber along with a field-line or gravel bed for final waste contaminant removal prior to discharge into adjacent ditch or body of water. These conventional systems rely almost exclusively on anaerobic bacteria inside the septic tank and therefore require the aerobic bacterial activity of a field-line or gravel bed for final waste decontamination.

Traditional field-line or gravel bed wastewater treatment techniques do not sufficiently decontaminate the wastewater in certain geographical locations, either because of percolation in rocky soils or higher water tables near bodies of water.

Most improvements in the art has focused on incorporating aerobic bacteria in the septic system. This has been achieved by separating the septic tank into separate sections so that oxygen is only fed into the portion with aerobic bacteria. The continuous pumping of oxygen into the system requires large amounts of power to maintain the system.

For example, U.S. Pat. No. 5,531,894 to Ball, et al. describes a method of treating wastewater with a aerobic filter separate from the primary septic tank.

U.S. Pat. No. 5,549,818 to Hansel describes an apparatus for treating wastewater which uses an inverted cone clarifier configuration which divides a single tank into two distinct sections so that air may be delivered to the aerobic zone but not the anaerobic zone.

Additionally, the prior art devices typically require the periodic addition of chemicals such as chlorine to remove toxic fecal coliform bacteria from the final treated wastewater.

What is needed is a sanitation device which can both remedy the current problem of insufficient decontamination in the field-line or gravel bed by providing post-septic or post-mechanical treatment, and overcome the shortfalls of the devices which pump oxygen in order to increase levels of aerobic bacteria.

OBJECTS OF THE INVENTION

It is an object of the present invention to provide a treatment system which is relatively lightweight.

Another object of the present invention is to provide a treatment system which does not require the operator to continually add chemicals.

Another object of the present invention is to provide a treatment system which uses a minimal amount of power.

Another object of the present invention is to provide a treatment system which has the capability to hold and treat more than one flush at a time.

Another object of the present invention is to provide a treatment system which is simple to operate.

Another object of the present invention is to provide an on-board treatment system which can meet Type II certification standards.

Another object of the present invention is to provide a land-based treatment system which can meet certification standards for locations on rocky soil and/or near bodies of water.

SUMMARY OF THE INVENTION

A device for the treatment of wastewater is provided. The basic device includes a wastewater inlet, a connecting means and a bioreactor. The bioreactor is a substantially water-tight compartment which has its bioreactor inlet fluidly connected to the connecting means which is fluidly connected to the wastewater inlet. Inside the substantially water-tight compartment are controlled porous media inoculated with nitrifying aerobic bacteria.

In most applications, the bioreactor inlet and bioreactor outlet are both adapted to prevent the controlled porous media from passing out of the bioreactor's substantially water-tight compartment and a fitting fluidly connected to the bioreactor outlet directs a portion of effluent out of the wastewater treatment system and a portion of effluent back into the connecting means.

Additionally, many applications will require a plurality of bioreactors to be able to handle larger loads of wastewater. The plurality of bioreactors are connected in series by a plurality of bioreactor connecting means, each bioreactor connecting means fluidly connecting one bioreactor's outlet to another bioreactor's inlet. Effluent enters the plurality of bioreactors' first bioreactor's inlet and exits the plurality of bioreactors from the last bioreactor's outlet.

In order to handle the greatest amount of wastewater, the plurality of bioreactors is connected to a primary treatment tank and a biofiltration tank. The primary treatment tank receives the wastewater inlet and can contain a volume of wastewater. A primary pump directs effluent from the primary treatment tank to the biofiltration tank. The primary pump is activated when the volume in the primary treatment tank reaches an activation capacity and is deactivated when the volume in the primary treatment tank reaches a deactivation capacity. The biofiltration tank contains controlled porous media inoculated with nitrifying aerobic bacteria. A secondary pump directs effluent from the biofiltration tank to the first bioreactor's inlet.

A feature of the present invention is that it is relatively lightweight.

Another feature of the present invention is that it does not require the operator to continually add chemicals.

Another feature of the present invention is that it uses less power than prior art systems.

Another feature of the present invention is that it is scalable to handle any volume of wastewater.

Another feature of the present invention is that it is simple to operate.

Another feature of the present invention is that it can meet Type II certification standards.

Another feature of the present invention is that it can meet certification standards for locations on rocky soil and/or near bodies of water.

These and other objects, advantages, and features of this invention will be apparent from the following description.

DETAILED DESCRIPTION OF THE PREFERRED EMBODIMENTS

Figure 1:
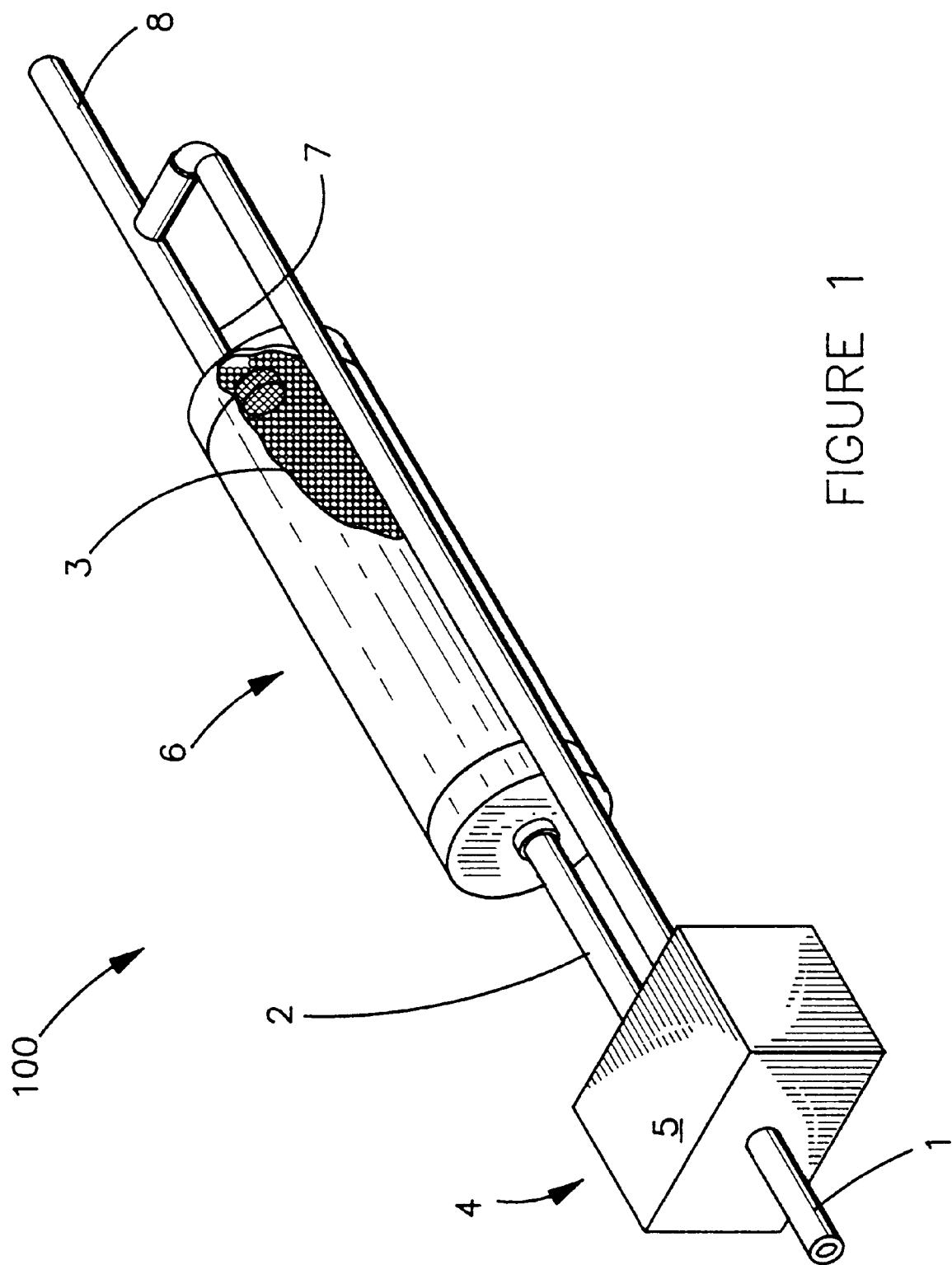
FIG. 1 is a perspective view of a preferred embodiment of the smallest version of the invention.

With reference to FIG. 1, a preferred embodiment of the wastewater treatment system 100 will now be described. Wastewater enters the device through wastewater inlet 1. The term wastewater, as used herein, is water which includes human waste. Wastewater can include both black water and grey water. Black water is generally defined as only the liquid and solid human body waste and the carriage water generated through toilet usage while grey water is usually defined as water other than sewage, such as sink drainage or washing machine discharge. Note that for some watercraft applications, the water will be salt water.

Processed wastewater leaves wastewater treatment system 100 through bioreactor outlet 2. The quality of the effluent is generally measured by the carbonaceous biochemical oxygen demand (CBOD), total suspended solids (TSS), and total nitrogen present.

Nitrogen in wastewater may exist as organic nitrogen, ammonia, nitrite, and nitrate. The nitrogen present in fresh wastewater is primarily organic nitrogen combined in proteinaceous matter and urea. Anaerobic bacteria decomposes the organic material to ammonia nitrogen. Nitrifying aerobic bacteria then oxidize the ammonia nitrogen to nitrate nitrogen.

In order to remove nitrogen from the system, nitrate nitrogen must be converted to a readily removable gaseous form of nitrogen. This conversion can be accomplished biologically under anoxic or anaerobic conditions by several genera of denitrifying bacteria. Denitrifying bacteria are capable of converting nitrite to nitrate, followed by production of nitric oxide (NO), nitrous oxide ($N_2O$), and nitrogen gas ($N_2$). The last three recited compounds are gaseous products that are released to the atmosphere and are thus removed from the system.

Similarly, CBOD is also reduced by the oxidation of organic carbon sources by bacteria. The organic carbon sources are oxidized into carbon dioxide ($CO_2$), a gaseous product which is released into the atmosphere.

Controlled porous medium 3 is inoculated with bacteria effective to decrease the CBOD and the nitrogen content of the wastewater. The porous cells of controlled porous media 3 provide a home not only for the microbes, but also for oxygen, water and nutrients to help sustain the life of the microorganisms. Diatomaceous earth ceramics such as CELITE®, produced by the Johns-Manville Corporation, ZELITE, produced by Grace and ISOLITE® produced by Sundine Enterprises, Inc. are commercially available controlled porous media 3. Each of these products allow bacteria to form inside of the substrate, and not merely on the surface.

Inoculation of controlled porous media can be performed either naturally or purposefully. Natural inoculation occurs when uninoculated controlled porous media is introduced directly into wastewater treatment system 100. As is documented by the prior art, it takes about ten days for the bacterial colonies to form and natural inoculation to be complete. Purposeful inoculation is performed when the substrate is placed in a medium conducive to bacteria growth and exposed to the bacteria.

Controlled porous media which are pre-inoculated with various species of bacteria effective to reduce the CBOD and nitrogen content of the wastewater are commercially available from AMS, Inc. in Baton Rouge, La. AMS, Inc. uses the inoculation methods described in U.S. Pat. Nos. 5,240,598 and 5,534,143 relating to microbubble generators for transfering oxygen to microbial inocula and microbubble generator immobilized cell reactors, which are incorporated herein by reference. It is preferable to use purposefully inoculated controlled porous media 3 to control the proportion of the different species of bacteria and to prevent undesirable bacteria from forming colonies.

Wastewater flows from wastewater inlet 1 to connecting means 4, which is shown in FIG. 1 as holding tank 5. The majority of the processing of the wastewater will occur in bioreactor 6. It is bioreactor 6 which houses controlled porous media 3. Wastewater will flow into bioreactor 6 through bioreactor inlet 7. Bioreactor 6 is a substantially water-tight compartment so that the pressure of the wastewater entering bioreactor inlet 7 will force processed effluent out of bioreactor outlet 2.

Ideally, bioreactor inlet 7 and bioreactor outlet 2 will be adapted to prevent controlled porous media 3 from passing out of bioreactor 6. This can be accomplished either by making the openings small enough so that controlled porous media 3 cannot pass through, or by using a screen. Note that if a plurality of small conduits are used for bioreactor inlet 7 and bioreactor outlet 2, the surface area of bioreactor inlet 7 and bioreactor outlet 2 will be greatly increased. A material which is lethal to fecal coliform bacteria may then be used if removal of fecal coliform bacteria is desired. Copper piping would be adequate for this purpose.

For applications where only a small space can be devoted to process wastewater (i.e., small marine vessels), wastewater treatment system 100 must be compact. Space can be conserved by recycling the wastewater through bioreactor 6 several times. The inventors have achieved excellent results by using a cylindrical bioreactor 6 which is about four inches in diameter and about two feet in total length. Wastewater was cycled through bioreactor 6 for about an hour. After an hour, the levels of nitrogen and CBOD in the wastewater would be reduced to acceptable levels. A valve connected to treated effluent outlet 8 can be programmed to open after an hour and allow effluent to leave the system. Treated effluent outlet 8 is preferably connected to either tank 5 or bioreactor inlet 7. If treated effluent outlet 8 is connected to bioreactor outlet 2, the effluent will not be as clean.

Figure 2A:
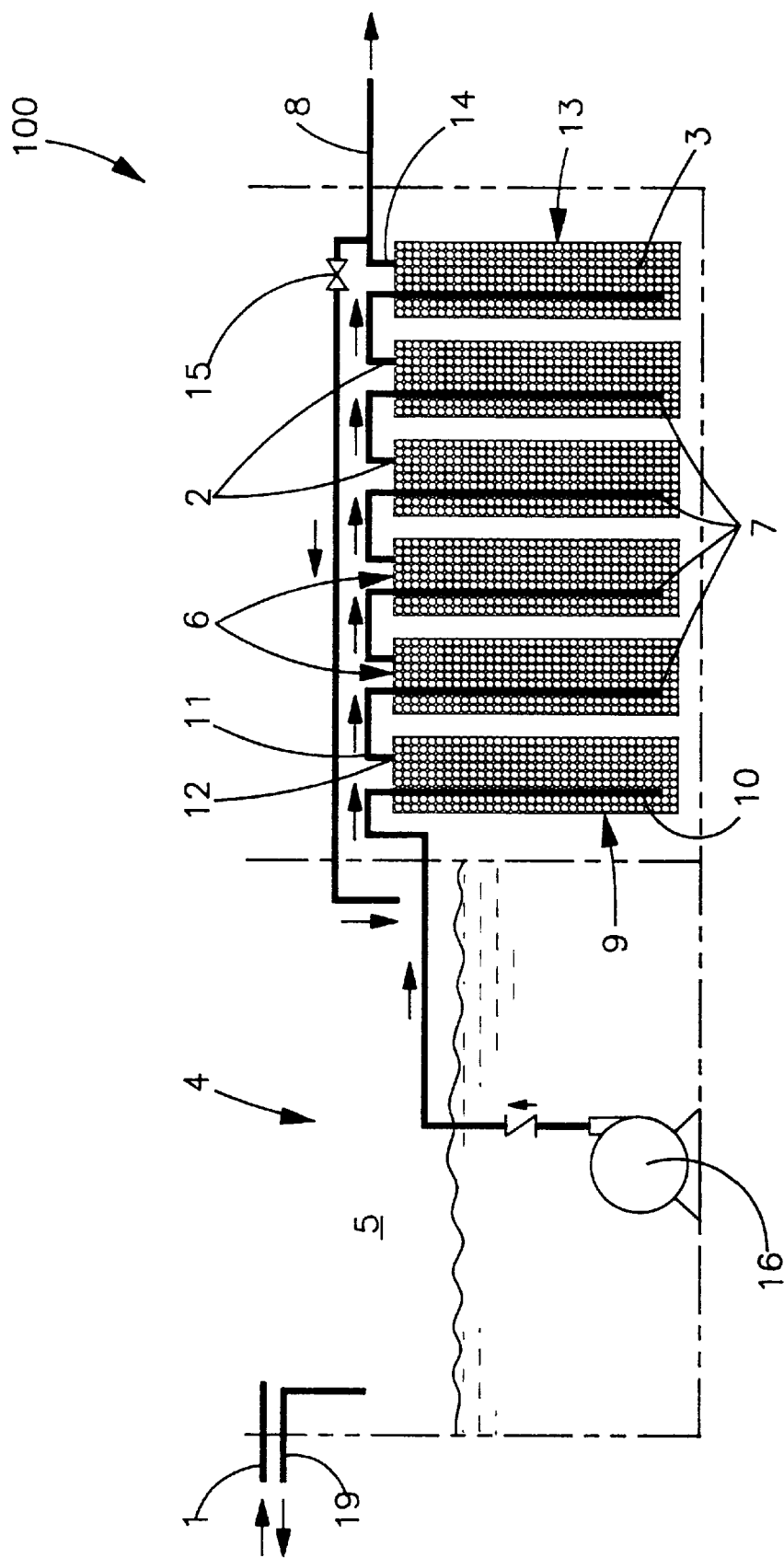
FIG. 2A is a plan view of a preferred embodiment of a medium version of the invention.
Figure 2B:
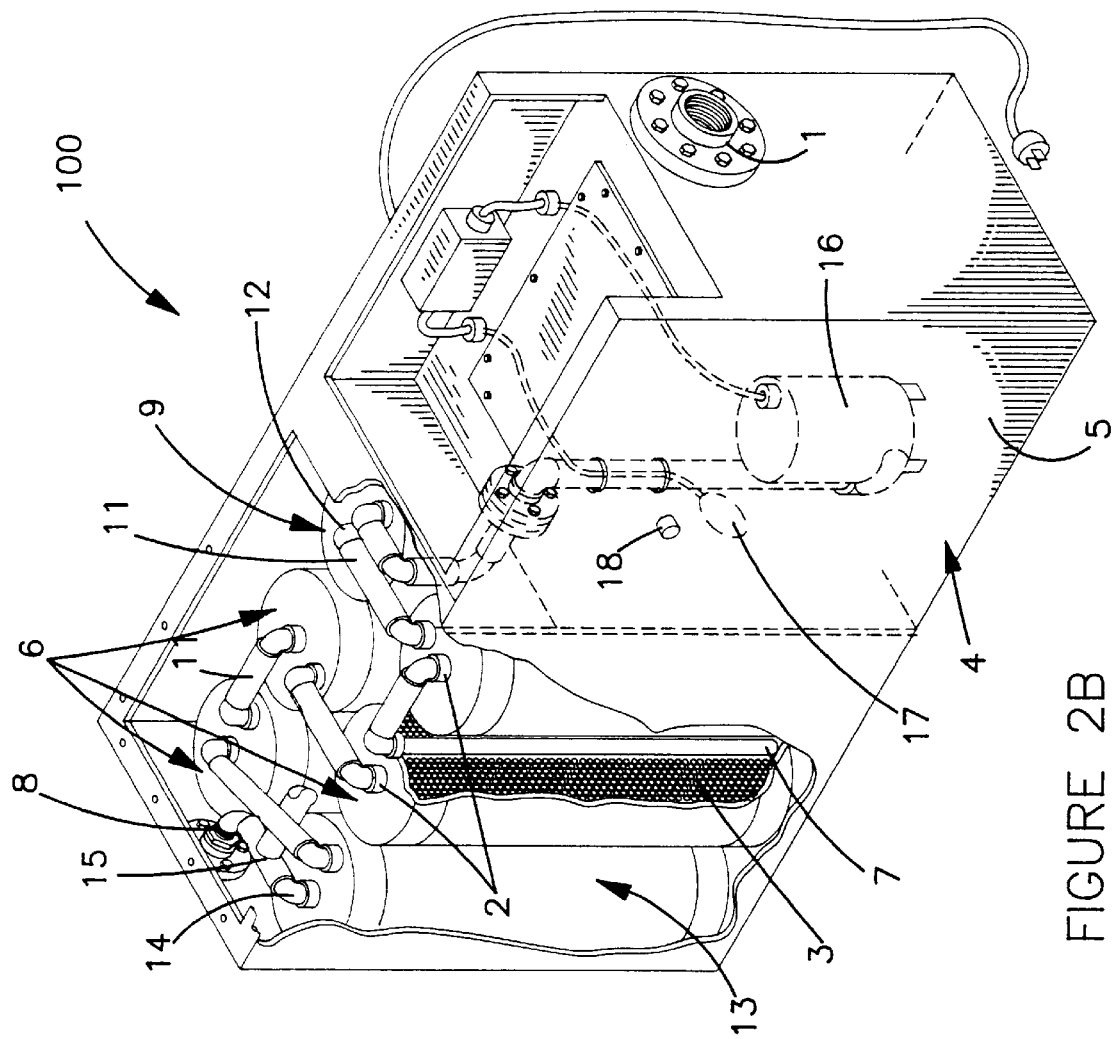
FIG. 2B is a perspective view of a preferred embodiment of a medium version of the invention.

If a larger area may be devoted to wastewater treatment wastewater treatment system may be configured in accordance with FIGS. 2A and 2B. In the embodiment shown in these figures, wastewater does not need to be continuously recycled and can be processed in a single pass. The key to adequately process wastewater in a single pass is passing the wastewater through a sufficient amount of inoculated controlled porous media 3. This can be accomplished by using a plurality of bioreactors in series, by using larger bioreactors, or both.

FIGS. 2A and 2B show a plurality of bioreacters connected to one another in series. Wastewater enters first bioreactor 9 through first bioreactor's inlet 10 (first bioreactor's inlet is shown only in FIG. 2A). Bioreactor connecting means 11 fluidly connects first bioreactor's outlet 12 with the next bioreactor's inlet 7. For example, a PVC pipe may be used as bioreactor's outlet 2, bioreactor connecting means 11 and the next bioreactor's inlet 7. The effluent leaves last bioreactor 13 through last bioreactor's outlet 14.

Ideally, connecting means 4 will also have appropriate bacteria to process wastewater before it flows into the plurality of bioreactors. This can be achieved by means of fitting 15 fluidly connected to bioreactor outlet 2 which directs a portion of effluent out of wastewater treatment system 100 and a portion of effluent back to connecting means 4. During normal use, some bacteria will separate from their colonies within controlled porous media 3, and by using fitting 15, some of this bacteria can be retained in the system. This is especially important if controlled porous media 3 have been purposefully inoculated with bacteria purified from its naturally occurring state. Of course, care should be used to prevent the system from overflowing by recycling too much effluent back into the system. Although the inventor believes better results are obtained by directing some effluent back to connecting means 4, this is not essential to the function of the invention. No specific percentage of flow directed to connecting means 4 appears to be particularly beneficial. The inventor has achieved acceptable results by using a "T" fitting which directs 25% of the effluent back to connecting means 4.

Pump 16 directs effluent from holding tank 5 to first bioreactor's inlet 10. If wastewater treatment device 100 is used as a post-processing device, added on to an existing wastewater treatment system, no special pump is needed. If wastewater treatment device 100 is, however, used as the primary treatment of wastewater, and no mechanical filtration is performed on the wastewater prior to processing, then the wastewater will need to be macerated to prevent clogging of the pump. Commercially available macerator pumps are sufficient for this purpose.

Mechanical filtration can be performed, for example, by placing pump 16 in holding tank 5 and enclosing the intake for pump 16 in a perforated baffle. Gravel, coal, fibers or any other mechanical filtration mechanism can then be placed inside holding tank 5 (but outside the enclosed pump intake). Wastewater which flows through the perforated baffle will then be mechanically filtered. Ideally, inoculated controlled porous media 3 will be used so wastewater can be both mechanically and biologically processed before entering pump 16.

Pump 16 should only be activated when holding tank 5 exceeds a predetermined volume ("activation capacity") and should be deactivated when the tank drops below another predetermined volume ("deactivation capacity") which is less than or equal to the activation capacity. As shown on FIG. 2B, level switch 17 is a simple, commercially available way to control pump 16. Pump 16 must have a means to deactivate to both conserve power and to prevent pump 16 from becoming damaged if holding tank 5 runs out of wastewater. Holding tank 5 should also have vent 18 to allow gasses such as NO, $N_2O$, $N_2$ and $CO_2$ to escape the system. Vent 18 is shown in FIG. 2B.

To prevent wastewater from backing up into a building's plumbing, FIG. 2A shows no-power bypass 19 which discharges untreated wastewater into the environment. No-power bypass 19 must be positioned below wastewater inlet 1 but above level switch 17. Generically speaking, if wastewater inlet 1 defines the top surface of a volume of wastewater ("full capacity"), no-power bypass 19 must direct wastewater out of the system before the wastewater reaches that full capacity volume. No-power bypass 19 must also allow pump 16 to work before directing wastewater out of the system, so no-power bypass 19 should not direct any wastewater out of the system unless the volume of wastewater is greater than the activation capacity volume.

Marine applications will not have a no-power bypass, as marine regulations prevent the dumping of untreated wastewater. Additionally, regulations require marine-grade fittings and materials to be used.

As shown in FIGS. 2A and 2B, increased efficiency may be had by positioning bioreactors' inlets 7 lower than bioreactors' outlets 2. By doing this, effluent must flow against gravity and particulates will settle on the bottom of bioreactor 6.

Figure 3:
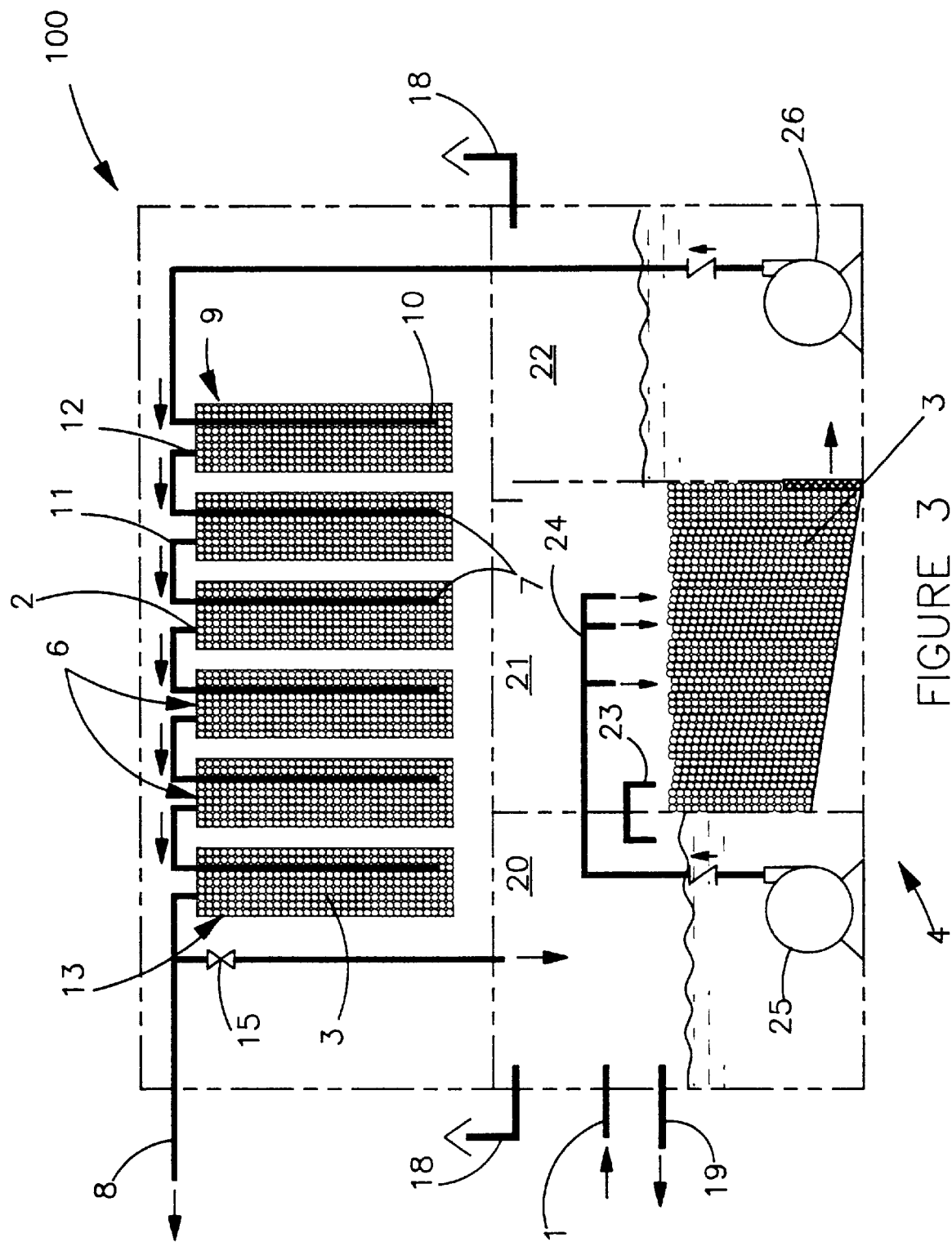
FIG. 3 is a plan view of a preferred embodiment of a large version of the invention.

FIG. 3 depicts wastewater treatment system 100 for processing large volumes of untreated wastewater. Although many of the components are similar to the previous embodiment, connecting means 4 comprises primary treatment tank 20, biofiltration tank 21 and secondary treatment tank 22. Six cylindrical bioreactors 6, in this embodiment, each about eight inches in diameter and about four feet in length is sufficient to treat the wastewater generated by a single household.

Primary treatment tank 20 is almost identical to holding tank 5 of the prior embodiment. Primary treatment tank, however, may have bypass line 23 unlike holding tank 5. Bypass line 23 is adapted to allow effluent to pass between biofiltration tank 21 and primary treatment tank 20.

Biofiltration tank 21 is filled with controlled porous medium 3 inoculated with bacteria effective to reduce nitrogen and CBOD. Effluent leaves biofiltration tank 21 by a perforated baffle positioned between biofiltration tank 21 and secondary treatment tank 22. Flow can be encouraged by sloping the bottom of biofiltration tank 21 in the direction of perforated baffle. Biofiltration tank 21 should be vented, either to atmosphere or to primary treatment tank 20 or secondary treatment tank 22 to prevent the build-up of gasses.

Diverter 24, is useful to distribute the effluent from primary pump 25 into biofiltration tank 21 such that the effluent does not enter biofiltration tank 21 in a single stream. Any number of diverters may be used, including a perforated pipe, a plurality of "Y" fittings, or a simple horizontal plate which distributes effluent around the plate's edges. If a plurality of PVC "Y" fittings are used, it may be useful to support diverter 24 from the side of biofiltration tank 21 to prevent damage when the unit is moved.

Diverter will also accomplish the function of breaking up any caked solids that may have formed on the surface of controlled porous media 3. Without diverter 24, caking may be serious enough to prevent any wastewater from flowing through controlled porous media 3. Wastewater would then either backup the system or escape out of the vents in biofiltration tank 21. Bypass line 23, therefore, should be located above the surface of controlled porous media 3 in biofiltration tank 21. Bypass line 23 will continuously cycle wastewater between biofiltration tank 21 and primary treatment tank 20 until the caking is broken up by the force of the flow coming from diverter 24.

If wastewater treatment system 100 is used for the primary treatment of wastewater, primary pump 25 will be a macerator pump unless another means for grinding the wastewater is used. If the effluent from biofiltration tank 21 is not sufficiently macerated, secondary pump 26 will also be a macerator pump. FIG. 3 also shows vents 18 in both primary treatment tank 20 and secondary treatment tank 22 to allows gasses such as NO, $N_2O$, $N_2$ and $CO_2$ to escape the system.

Pumping effluent out of secondary treatment tank 22 is preferable to pumping effluent directly out of biofiltration tank for two reasons. First, it is easier to prevent controlled porous media from clogging secondary pump 26, and second, it is easier to regulate the activation of secondary pump 26.

Like primary pump 25, secondary pump 26 should only be activated when secondary treatment tank 22 exceeds a predetermined volume ("secondary treatment tank activation capacity") and should be deactivated when the volume in the tank drops below another predetermined volume ("secondary treatment tank deactivation capacity") which is less than or equal to the secondary treatment tank activation capacity.

There are of course other alternate embodiments which are obvious from the foregoing descriptions of the invention, which are intended to be included within the scope of the invention, as defined by the following claims.

PARTS LIST wastewater treatment system 100
wastewater inlet 1
bioreacter outlet 2
Controlled porous medium 3
connecting means 4
holding tank 5
bioreactor 6
bioreactor inlet 7
Treated effluent outlet 8
First bioreactor 9
first bioreactor's inlet 10
bioreactor connecting means 11
first bioreactor's outlet 12
last bioreactor 13
last bioreactor's outlet 14
fitting 15
pump 16
level switch 17
vent 18
No-power bypass 19
primary treatment tank 20
biofiltration tank 21
secondary treatment tank 22
bypass line 23
diverter 24
primary pump 25
secondary pump 26

I claim:

1. A wastewater treatment system comprising:
    (a) a wastewater inlet;
    (b) a connecting means comprising:
        (i) a primary treatment tank connected to said wastewater inlet and being adapted to receive a volume of wastewater, said wastewater inlet defining the top surface of the full capacity volume; and
        (ii) a biofiltration tank containing controlled porous media inoculated with nitrifying aerobic bacteria;
    (c) a primary pump which directs effluent from said primary treatment tank to said biofiltration tank, said primary pump being adapted to activate when the volume in said primary treatment tank exceeds an activation capacity, and said primary pump being further adapted to deactivate when the volume in said primary treatment tank falls below a deactivation capacity, said activation capacity volume being greater than or equal to said deactivation capacity volume and less than said full capacity volume;

(d) a bioreactor, comprising:
  (i) a substantially water-tight compartment;
  (ii) a bioreactor inlet fluidly connected to said connecting means, said connecting means being fluidly connected to said wastewater inlet;
  (iii) a bioreactor outlet;
  (iv) controlled porous media inoculated with bacteria effective to reduce CBOD and nitrogen, wherein said controlled porous media are contained inside said substantially water-tight compartment; and
  (vii) said bioreactor inlet and said bioreactor outlet being adapted to prevent said controlled porous media from passing out of said substantially water-tight compartment; and
(e) a secondary pump adapted to direct effluent from said biofiltration tank to said bioreactor inlet.

2. The wastewater treatment system of claim 1 further comprising:
  (a) a plurality of said bioreactors, said plurality of bioreactors comprising a first bioreactor and a last bioreactor; and
  (b) a plurality of bioreactor connecting means, each bioreactor connecting means fluidly connecting one bioreactor's outlet to another bioreactor's inlet such that said plurality of bioreactors are connected in series such that effluent enters said plurality of bioreactors from said first bioreactor's inlet, and effluent exits said plurality of bioreactors from said last bioreactor's outlet.

3. The wastewater treatment system of claim 2 wherein said bioreactors' inlets are positioned lower than said bioreactors' outlets.

4. The wastewater treatment system of claim 2 wherein said primary treatment tank further comprises a no-power bypass outlet adapted to direct effluent out of said wastewater treatment system when said primary treatment tank volume reaches a capacity greater than said activation capacity volume and less than said full capacity volume.

5. A wastewater treatment system comprising:
  (a) a wastewater inlet;
  (b) a connecting means;
  (c) a bioreactor comprising:
    (i) a substantially water-tight compartment;
    (ii) a bioreactor inlet fluidly connected to said connecting means, said connecting means being fluidly connected to said wastewater inlet;
    (iii) a bioreactor outlet;
    (iv) controlled porous media inoculated with bacteria effective to reduce CBOD and nitrogen, wherein said controlled porous mediaare is contained inside said substantially water-tight compartment;
    (v) wherein said bioreactor inlet and said bioreactor outlet are adapted to prevent said controlled porous media from passing out of said substantially water-tight compartment; and
  (e) a plurality of bioreactors, said plurality of bioreactors comprising a first bioreactor and a last bioreactor;
  (f) a plurality of bioreactor connecting means, each bioreactor connecting means fluidly connecting one bioreactor's outlet to another bioreactor's inlet such that said plurality of bioreactors are connected in series such that effluent enters said plurality of bioreactors from said first bioreactor's inlet, and effluent exits said plurality of bioreactors from said last bioreactor's outlet;
  (g) a primary pump wherein:
    (i) said connecting means comprises a primary treatment tank adapted to receive said wastewater inlet and being adapted to receive a volume of wastewater, said wastewater inlet defining the top surface of the full capacity volume; and
    (ii) said primary pump:
      directs effluent from said primary treatment tank to said inlet of said first bioreactor;
      is adapted to activate when the volume in said primary treatment tank exceeds a primary treatment tank activation capacity; and is adapted to deactivate when the volume in said primary treatment tank falls below a deactivation capacity, the volume of said primary treatment tank activation capacity being greater than or equal to said primary treatment tank deactivation capacity volume and less than said primary treatment tank full capacity volume;,
  (h) wherein said primary treatment tank further comprises a no-power bypass outlet adapted to direct effluent out of said wastewater treatment system when said primary treatment tank volume reaches a capacity greater than said primary treatment tank activation capacity volume and less than said primary treatment tank full capacity volume; and said primary treatment tank is vented to the atmosphere; and
  (i) wherein said connecting means further comprises a secondary treatment tank wherein:
    (i) said effluent from said biofiltration tank flows into said secondary treatment tank prior to being directed to said inlet of said first bioreactor by a secondary pump, said secondary treatment tank being adapted to prevent said controlled porous media from passing out of said secondary treatment tank; and
    (ii) said secondary pump is adapted to activate when the volume in said secondary treatment tank exceeds a secondary treatment tank activation capacity and is adapted to deactivate when the volume in said secondary treatment tank falls below a secondary treatment tank deactivation capacity, the volume of said secondary treatment tank activation capacity being greater than or equal to said secondary treatment tank deactivation capacity volume.

6. The wastewater treatment system of claim 5 further comprising a diverter and a bypass line, wherein:
  (a) said diverter distributes said effluent from said primary pump into said biofiltration tank such that said effluent does not enter said biofiltration tank in a single stream; and
  (b) said bypass line is adapted to allow effluent to pass between said biofiltration tank and said primary treatment tank; said bypass line being located above said controlled porous media in said biofiltration tank.

7. The wastewater treatment system of claim 6 further comprising a fitting, wherein:
  (a) said fitting is fluidly connected to said last bioreactor's outlet which directs a portion of effluent out of said wastewater treatment system and a portion of effluent into said connecting means;
  (b) said primary pump is a macerator pump;
  (c) said secondary pump is a macerator pump;
  (d) said primary treatment tank is vented to the atmosphere;
  (e) said secondary treatment tank is vented to the atmosphere;
  (e) said biofiltration tank has a sloped bottom to encourage flow towards secondary treatment tank; and
  (f) said bioreactors' inlets are positioned lower than said bioreactors' outlets.

* * * * *